US009633479B2

(12) United States Patent
Grasso et al.

(10) Patent No.: US 9,633,479 B2
(45) Date of Patent: Apr. 25, 2017

(54) TIME CONSTRAINED AUGMENTED REALITY

(71) Applicant: Canon Kabushiki Kaisha, Tokyo (JP)

(72) Inventors: Matthew John Grasso, Macquarie Park (AU); Belinda Margaret Yee, Balmain (AU); David Robert James Monaghan, Elanora Heights (AU); Oscar Alejandro De Lellis, Clovelly (AU); Rajanish Calisa, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 14/579,875

(22) Filed: Dec. 22, 2014

(65) Prior Publication Data

US 2015/0206353 A1 Jul. 23, 2015

(30) Foreign Application Priority Data

Dec. 23, 2013 (AU) ................................ 2013273829

(51) Int. Cl.
*G06T 19/00* (2011.01)
*G09G 5/18* (2006.01)
*G06F 3/147* (2006.01)

(52) U.S. Cl.
CPC ............ *G06T 19/006* (2013.01); *G06F 3/147* (2013.01)

(58) Field of Classification Search
CPC .. G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; H04N 5/272; A63F 13/10
See application file for complete search history.

(56) References Cited

U.S. PATENT DOCUMENTS

| 6,295,367 | B1* | 9/2001 | Crabtree | G01S 3/7865 |
| | | | | 382/103 |
| 6,556,206 | B1* | 4/2003 | Benson | G06T 19/00 |
| | | | | 345/427 |
| 6,605,120 | B1* | 8/2003 | Fields | G06F 17/30867 |
| | | | | 707/E17.109 |
| 7,174,029 | B2* | 2/2007 | Agostinelli | G06Q 30/02 |
| | | | | 382/100 |
| 2004/0183751 | A1 | 9/2004 | Dempski | |
| 2010/0265364 | A1* | 10/2010 | Robinson | G06T 3/00 |
| | | | | 348/241 |
| 2010/0328492 | A1* | 12/2010 | Fedorovskaya | G06Q 30/02 |
| | | | | 348/231.2 |
| 2011/0090219 | A1 | 4/2011 | Kruglick | |

(Continued)

FOREIGN PATENT DOCUMENTS

EP 2570994 A1 3/2013

*Primary Examiner* — Todd Buttram

(74) *Attorney, Agent, or Firm* — Canon USA, Inc. I.P. Division

(57) ABSTRACT

A method of displaying virtual content on an augmented reality device (101) is disclosed. The virtual content is associated with a scene. An image of a scene captured using the augmented reality device (101) is received. A viewing time of the scene is determined, according to a relative motion between the augmented reality device and the scene. Virtual content is selected, from a predetermined range of virtual content, based on the determined viewing time. The virtual content is displayed on the augmented reality device (101) together with the image of the scene.

19 Claims, 13 Drawing Sheets

(56) References Cited

U.S. PATENT DOCUMENTS

| | | | |
|---|---|---|---|
| 2011/0265117 A1* | 10/2011 | Cha | H04H 60/32 |
| | | | 725/35 |
| 2012/0066705 A1* | 3/2012 | Harada | H04N 21/4662 |
| | | | 725/12 |
| 2012/0329432 A1* | 12/2012 | Gupta | G06Q 30/02 |
| | | | 455/414.1 |
| 2013/0156297 A1* | 6/2013 | Shotton | G06K 9/6255 |
| | | | 382/159 |
| 2013/0181892 A1* | 7/2013 | Liimatainen | G06F 3/011 |
| | | | 345/156 |
| 2013/0314553 A1* | 11/2013 | Sun | H04N 21/44008 |
| | | | 348/192 |
| 2014/0062997 A1* | 3/2014 | Patil | G06F 3/012 |
| | | | 345/419 |
| 2014/0139609 A1* | 5/2014 | Lu | H04N 7/15 |
| | | | 348/14.03 |
| 2014/0244750 A1* | 8/2014 | Redfern | H04L 67/02 |
| | | | 709/204 |

\* cited by examiner

TIME CONSTRAINED AUGMENTED REALITY

REFERENCE TO RELATED PATENT APPLICATION(S)

This application claims the benefit under 35 U.S.C. §119 of the filing date of Australian Patent Application No. 2013273829, filed 23 Dec. 2013, hereby incorporated by reference in its entirety as if fully set forth herein.

TECHNICAL FIELD

The present invention relates to data representation and, more particularly, to providing additional value to printed documents. The present invention also relates to a method and apparatus for displaying virtual content on a page, and to a computer program product including a computer readable medium having recorded thereon a computer program for displaying virtual content on a page using an augmented reality display.

BACKGROUND

Printed documents have been a primary source of communication for many centuries. Printed documents have been used widely across different domains such as in news reporting, advertising, office environments (large and small offices alike) and so on. The last decade has witnessed an explosion in popularity of mobile hand-held devices such as personal digital assistants, smart phones and more recently tablet devices. The ubiquitous nature of print media and ever increasing popularity of the mobile hand-held devices have led to a new genre of applications based on augmented reality.

Augmented reality (or AR) is a view of a physical world where some elements of physical reality are augmented by computer generated inputs such as sound, graphics and so on. Due to vast improvements in processing power and other capabilities, the hand held devices are now able to host augmented reality applications. Such host augmented reality applications enable an end-user to retrieve additional information related to a captured image of a real world object using a camera connected to a device (e.g. a camera phone) and to augment the additional information to a real world object. Such a real-world object may be a natural image in a document, a piece of textual information, a physical object such as a printer and so on. In addition to hand-held devices, several other devices such as head-mounted displays, and heads-up displays (such as in a car) are also gaining popularity for hosting augmented reality applications.

One method of displaying augmented reality content increases the amount of augmented reality content displayed when a person stares at an object for an extended period of time.

In another method of displaying augmented content, augmented reality content is customised by varying opacity of the augmented reality content presented to a user according to the amount of time that the user has spent viewing the content.

However, the above methods can confuse a user as content varies while the user is viewing the content.

Thus, a need exists to make an augmented viewing experience better for a user.

SUMMARY

It is an object of the present invention to substantially overcome, or at least ameliorate, one or more disadvantages of existing arrangements.

According to one aspect of the present disclosure, there is provided a method of displaying virtual content on an augmented reality device, the virtual content being associated with a scene, the method comprising:
  receiving an image of a scene captured using the augmented reality device;
  determining a viewing time of the scene, according to a relative motion between the augmented reality device and the scene;
  selecting virtual content, from a predetermined range of virtual content, based on the determined viewing time; and
  displaying the virtual content on the augmented reality device together with the image of the scene.

According to another aspect of the present disclosure, there is provided a system for displaying virtual content on an augmented reality device, the virtual content being associated with a scene, the system comprising:
  a memory for storing data and a computer program;
  a processor coupled to the memory for executing the computer program, the computer program comprising instructions for:
    receiving an image of a scene captured using the augmented reality device;
    determining a viewing time of the scene, according to a relative motion between the augmented reality device and the scene;
    selecting virtual content, from a predetermined range of virtual content, based on the determined viewing time; and
    displaying the virtual content on the augmented reality device together with the image of the scene.

According to still another aspect of the present disclosure, there is provided an apparatus for displaying virtual content on an augmented reality device, the virtual content being associated with a scene, the apparatus comprising:
  means for receiving an image of a scene captured using the augmented reality device;
  means for determining a viewing time of the scene, according to a relative motion between the augmented reality device and the scene;
  means for selecting virtual content, from a predetermined range of virtual content, based on the determined viewing time; and
  means for displaying the virtual content on the augmented reality device together with the image of the scene.

According to still another aspect of the present disclosure, there is provided a computer readable medium having a computer program stored thereon for displaying virtual content on an augmented reality device, the virtual content being associated with a scene, the program comprising:
  code for receiving an image of a scene captured using the augmented reality device;
  code for determining a viewing time of the scene, according to a relative motion between the augmented reality device and the scene;
  code for selecting virtual content, from a predetermined range of virtual content, based on the determined viewing time; and
  code for displaying the virtual content on the augmented reality device together with the image of the scene.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
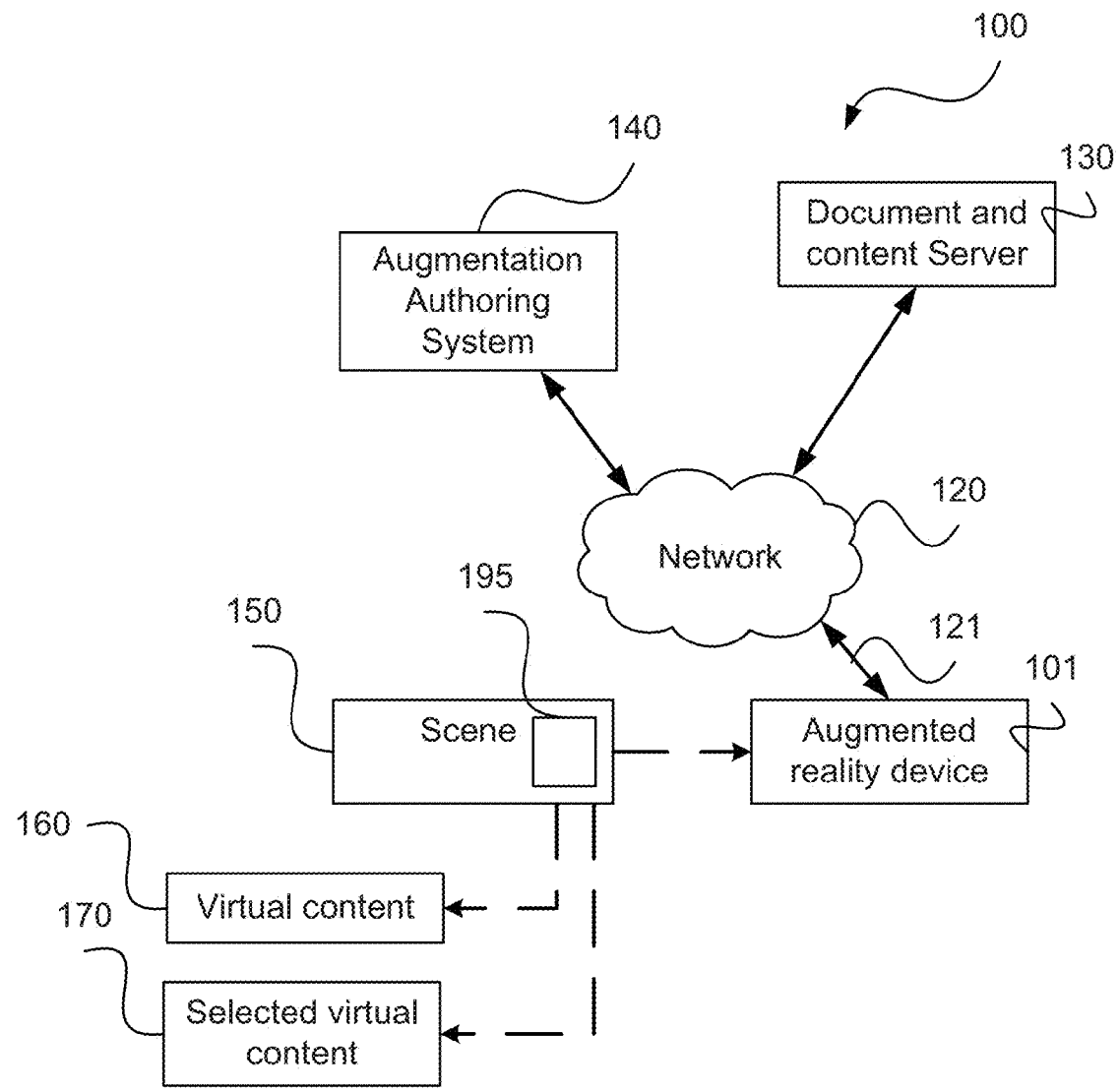
FIG. 1A is a schematic block diagram of a data processing system.

Where reference is made in any one or more of the accompanying drawings to steps and/or features, which have the same reference numerals, those steps and/or features have for the purposes of this description the same function(s) or operation(s), unless the contrary intention appears.

Advertisements are present on surfaces of public areas. Augmented reality may be used to increase the impact and content of such advertisements by displaying augmented content to viewers of the advertisements.

One method of providing augmentations to advertisements is through using image recognition and tracking technologies. Such technologies include Scale Invariant Feature Transform (SIFT) and Speeded up Robust Features (SURF), that are used to perform image recognition. SIFT is a method of identifying key-points or features in a natural image and of determining feature vectors which describe the features. In SIFT, object recognition is performed by comparing and matching features of a given natural image of an object against a database of image features. Such a database may be implemented using techniques such as a k-dimensional trees (k-d trees), spill trees and so on. Other simpler methods for recognising an image make use of visible markers such as barcodes and quick response (QR) codes.

Generally, all users viewing an augmented reality enabled advertisement will see the same augmented reality content every time the advertisement is seen. However, in some cases, it may be desirable to customise the augmented reality content for a particular user and context.

A single document comprises at least a single page, and often multiple pages. A printable page contains all information necessary for printing that page. The printable page is typically provided in the form of a description of the page to be printed, specified using a high-level Page Description Language (PDL), such as Adobe® PDF or Hewlett-Packard® PCL. The PDL provides descriptions of graphic objects to be rendered onto the page in a rendering order (z-order). Graphic objects typically consist of artifacts such as text, lines, fill regions, and image data. A raster representation of the page is made up of colour pixel data. Similarly, a raster representation of a graphic object is also made up of colour pixel data. Augmented content, that is associated with graphic objects, may be defined as computer-generated sensory input such as sound, video, graphics or global positioning system (GPS) data.

For any object in an image, points of interest within the object can be extracted to provide a "feature description" of the object. A feature description consists of a keypoint which locates the XY position of the feature within the image and a vector consisting of a set of numbers associated with neighbouring pixels of the keypoint. A feature description is also known as a feature point or feature. A "feature set", or "features" are defined as two or more feature points that are associated with the same image. A "strong feature" is defined as a feature that is robust to images that have undergone some form of affine transform. Feature descriptions of objects in an image can be used to match an image of an object against a database of feature descriptions captured from known images of the object, effectively identifying the object in an image. The process of computing feature descriptions for an image is called feature extraction. Hence, features are the output of performing feature extraction on an image.

An images captured from a scene may contain objects such as documents, boxes, people, and other items. A document contained in a captured image of a scene may represent an advertisement. The advertisement may contain images, text, or other media. Feature extraction may be performed on a captured image of a scene to identify an advertisement present in the scene.

An object in an image whose feature points are known can be tracked from one image frame to another image frame without having to determine the feature points again. Additionally, feature points may be used to determine a pose of the object in the image. The pose is a measure of orientation of the object, relative to a camera. Pose information will normally be represented as a mix of angles measuring roll, pitch and yaw values in addition to a distance from the camera to the object.

FIG. 1A is a schematic block diagram of a data processing system 100, upon which methods to be described may be practiced. The system 100 comprises an electronic device 101 for use in viewing a scene, such as the scene 150. The scene 150 of FIG. 1A is a real world view that, in the example of FIG. 1A, contains an object representing a document 195 containing content. The content may be augmented. The document 195 may be created by a user. In the example of FIG. 1A, the document 195 is a poster-sized printed advertisement presented on a wall.

The electronic device 101 is a mobile electronic device, such as a tablet, mobile phone, or head mounted display (e.g., augmented reality goggles). The device 101 may be referred to as an augmented reality device.

The electronic device 101 may be used for capturing images of the scene 150.

The device 101 is connected to communications network 120 via a connection 121. The communications network 120 may be a wide-area network (WAN), such as the Internet, a cellular telecommunications network, a private WAN, or a local area network (LAN).

The system 100 also comprises an augmentation authoring system 140 which may be used to create and edit the document 195. The augmentation authoring system 140 allows users creating documents (e.g., document 195) to create virtual content 160. In the example of FIG. 1, the virtual content 160 is associated with one or more documents including the document 195. In one implementation, the augmentation authoring system 140 is a general purpose computer system.

The system 100 also comprises a document and content server 130 which is configured to store extracted image features and the associated virtual content 160. The document and content server 130 may be implemented as a general purpose computer system.

Typically, a user operating the augmented reality device 101 captures an image of the scene 150 that contains the document 195. The augmented reality device 101 analyses the captured image and attempts to track documents in the scene 150, such as the document 195. If the augmented reality device 101 is unable to track or recognise the document 195 in the scene 150 then the augmented reality device 101 sends the captured image of the scene 150 and location information to the document and content server 130, via the network 120.

The document and content server 130 extracts feature points from the captured image of the scene 150 received from the augmented reality device 101. The document and content server 130 identifies the document 195 in the captured image of the scene 150 and sends a document identifier of the identified document 195 to the augmented reality device 101 together with stored image features for the document 195.

Figure 3:
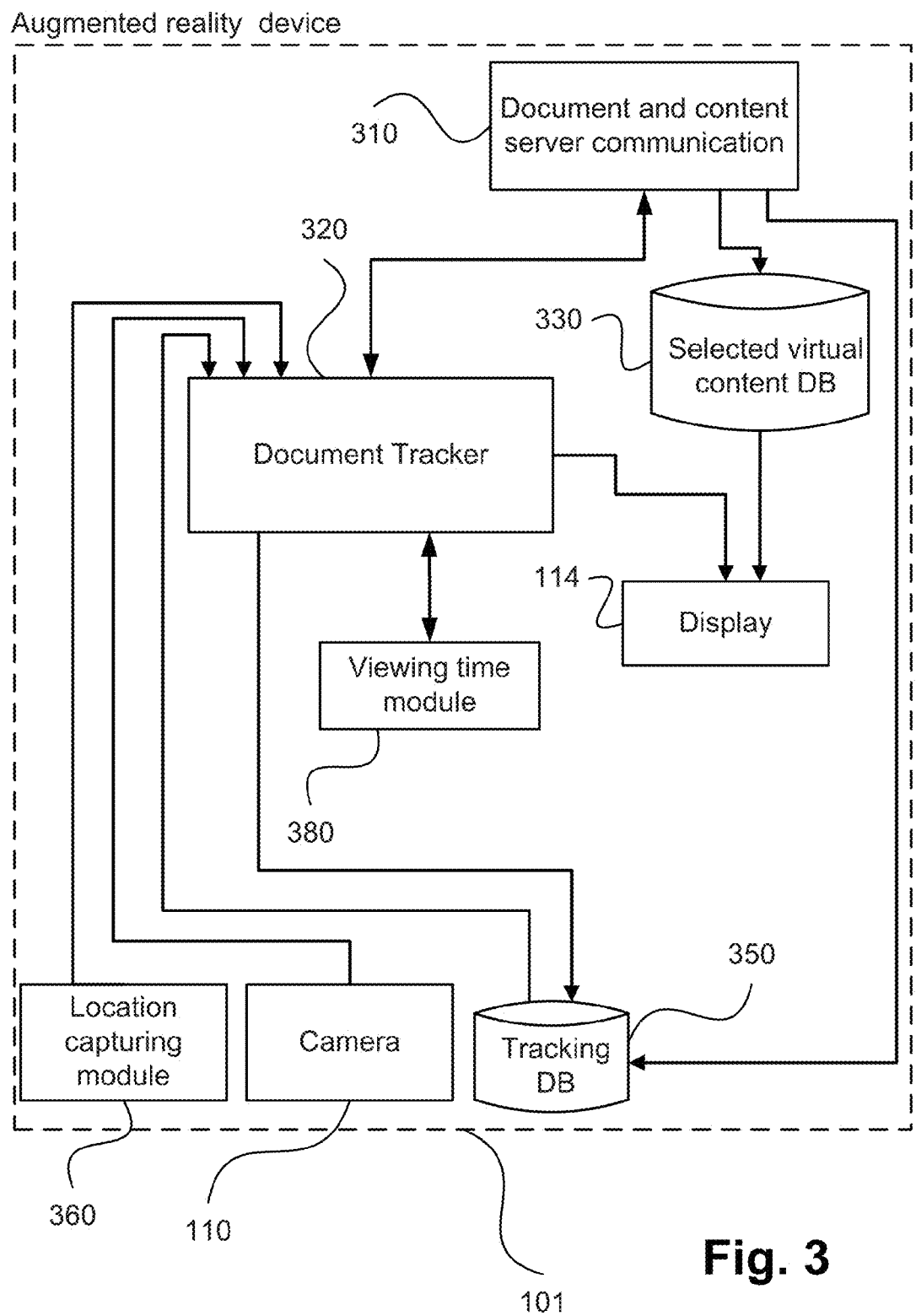
FIG. 3 is a schematic block diagram showing a software architecture of the electronic device.

The augmented reality device 101 receives the document identifier of the identified document 195 and stored image features for the document 195 in the scene 150 and performs tracking of the document 195 using a document tracker 320 as seen in FIG. 3. Once tracked, the augmented reality device 101 determines a viewing time representing an estimate of the amount of time that the user has to view the identified document 195, using a viewing time module 380, and relays the viewing time information to the document and content server 130.

The document and content server 130 receives the viewing time information and a document identifier identifying the document 195. The document and content server 130 then selects one or more portions of the virtual content 160 that is displayable within the viewing time period determined by the viewing time module 380. The document and content server 130 then sends the selected virtual content 160 as selected virtual content 170 to the device 101.

As described above, in one implementation, the augmented authoring system 140 is a general purpose computer. The augmented authoring system 140 may have a computer desktop application resident within the system 140 to allow a user to send the document 195 and associated virtual content 160 to the document and content server 130. Alternatively, a web-hosted application may be used by the system 140 for sending the document 195 and associated virtual content 160 to the document and content server 130.

The document and content server 130 and the augmented reality device 101 will be described in detail below.

The virtual content 160 is content defined by a user during creating the document 195 using the augmented authoring system 140. The virtual content 160 may be stored in the document and content server 130. The document 195 has an identifying document identifier and at least one portion of the virtual content 160. The identifier and portion of virtual content 160 is associated together and stored in the document and content server 130.

The selected virtual content 170 represents the virtual content 160 selected by the document and content server 130 for display on the augmented reality device 101.

Figure 1B:
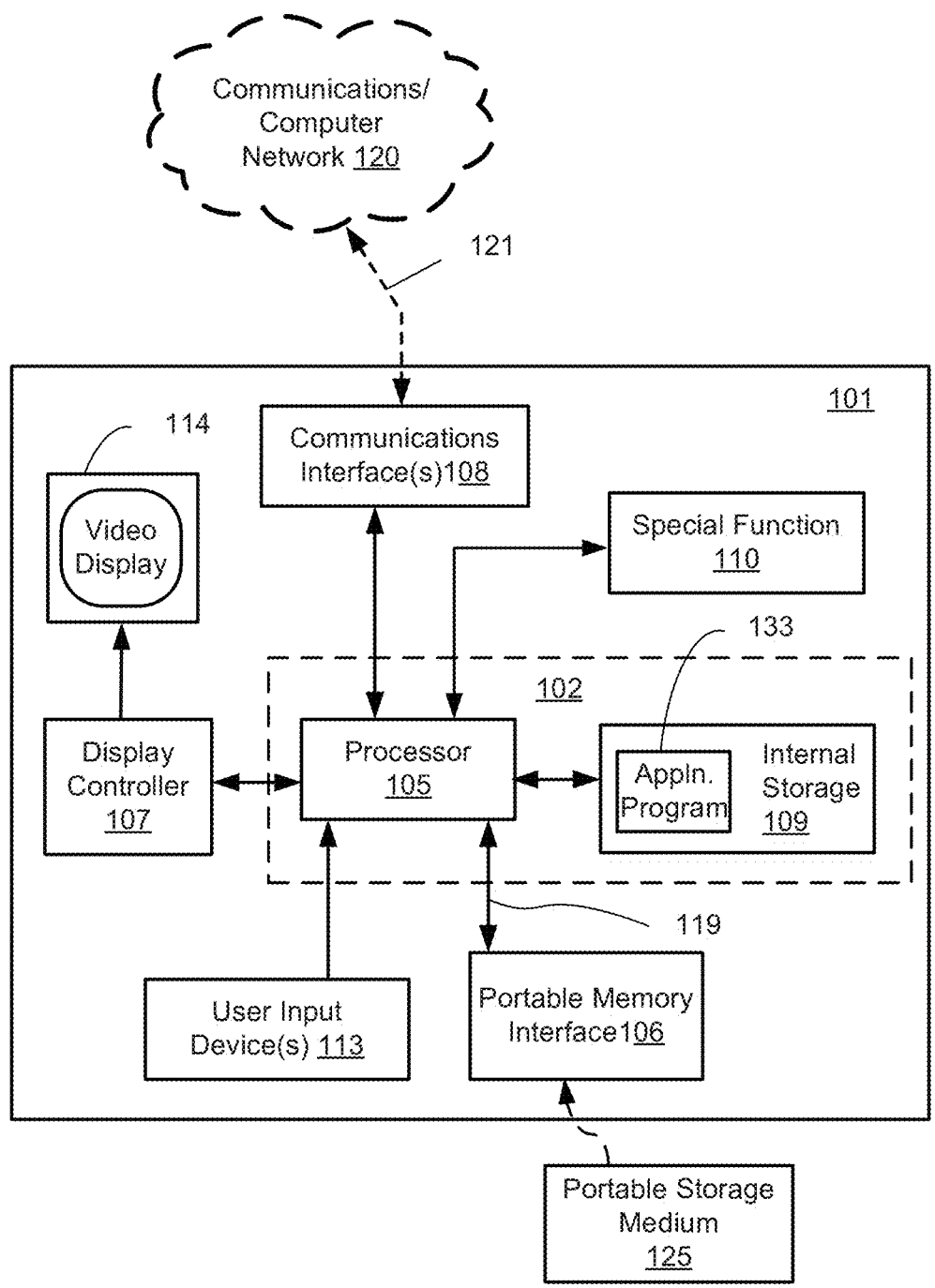
FIGS. 1B and 1C collectively form a schematic block diagram representation of the electronic device of the system of FIG. 1A.
Figure 1C:
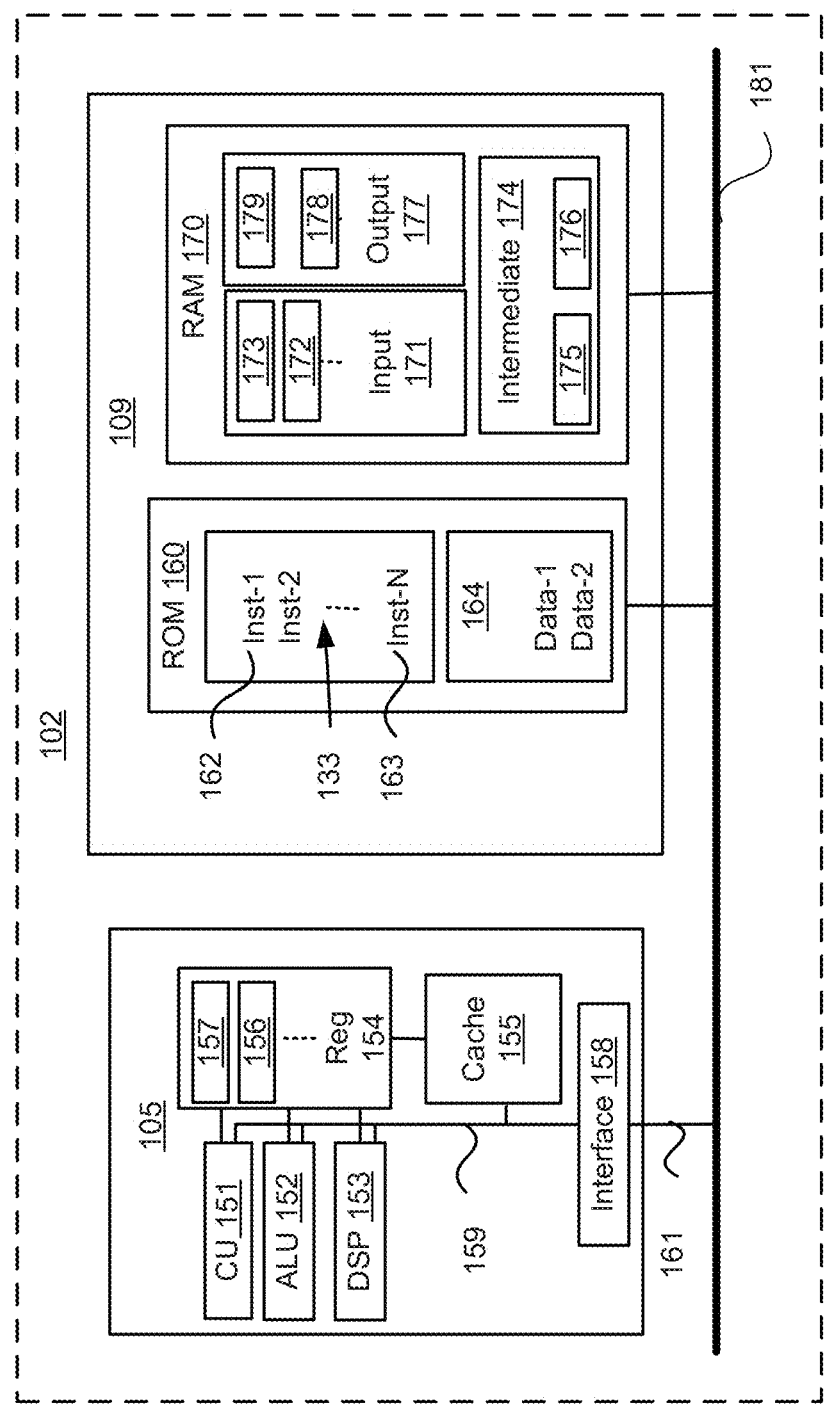

FIGS. 1B and 1C collectively form a schematic block diagram of the electronic device 101 upon which methods 400, 500 and 600, to be described with reference to FIGS. 4, 5 and 6, respectively, may be performed. The device 101 may include embedded components. The device 101 is a mobile electronic device, such as a tablet, a mobile phone, or head mounted display (e.g., augmented reality goggles), in which processing resources are limited. The device 101 may also be practiced on other mobile devices comprising a camera, a scanning device, and/or a display on which the augmented content may be displayed.

The methods 400, 500 and 600 to be described may also be performed on higher-level devices such as desktop computers, server computers, and other such devices with significantly larger processing resources.

As seen in FIG. 1B, the device 101 comprises an embedded controller 102. Accordingly, the device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1C. The RAM 170 may be volatile, non-volatile or a combination of volatile and non-volatile memory.

The device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1B, the device 101 also comprises a portable memory interface 106, which is coupled to the processor 105 via a connection 119. The portable memory interface 106 allows a complementary portable memory device 125 to be coupled to the device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 101 also has a communications interface 108 to permit coupling of the device 101 to a computer or the communications network 120 via the connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the device 101 is configured to perform some special function 110. The embedded controller 102, possibly in conjunction with further special function components, is provided to perform that special function 110. As described here, the device 101 comprises a digital camera 110 comprising a lens, focus control and image sensor of the camera. The digital camera 110 is connected to the embedded controller 102.

However, as another example, the device 101 may be a mobile telephone handset. In this instance, the device may comprise components required for communications in a cellular telephone environment. Where the device 101 is a portable device, the device 101 may also comprise a number of encoders and decoders of a type including Joint Photographic Experts Group (JPEG), (Moving Picture Experts Group) MPEG, MPEG-1 Audio Layer 3 (MP3), and the like.

The methods 400, 500 and 600 described hereinafter may be implemented using the embedded controller 102, where the processes of FIGS. 4, 5 and 6 may be implemented as one or more software application programs 133 executable within the embedded controller 102. The device 101 may be used to implement the methods 400, 500 and 600. In particular, with reference to FIG. 1C, the steps of the described methods 400, 500 and 600 are effected by instructions in the software 133 that are carried out within the controller 102. The software instructions may be formed as one or more code modules, each for performing one or more particular tasks. The software may also be divided into two separate parts, in which a first part and the corresponding code modules performs the methods 400, 500 and 600 and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the device 101. However, in some instances, the application programs 133 may be supplied to the user encoded on one or more CD-ROM (not shown) and read via the portable memory interface 106 of FIG. 1C prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1B. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1C illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the device 101. Typically, the application program 133 waits for events and subsequently executes the block of code associated with that event. Events may be triggered in response to input from a user, via the user input devices 113 of FIG. 1B, as detected by the processor 105. Events may also be triggered in response to other sensors and interfaces in the device 101.

The execution of a set of the instructions may require numeric variables to be read and modified. Such numeric variables are stored in the RAM 170. The method 400, 500 and 600 use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods 400, 500 and 600 described below is associated with one or more segments of the application program 133, and is performed by repeated execution of a fetch-execute cycle in the processor 105 or similar programmatic operation of other independent processor blocks in the device 101.

The described methods 400, 500 and 600 may alternatively be implemented in dedicated hardware such as one or more integrated circuits performing the functions or sub functions of described methods 500, 600 and 800. Such dedicated hardware may include graphic processors, digital signal processors, or one or more microprocessors and associated memories.

Figure 10A:
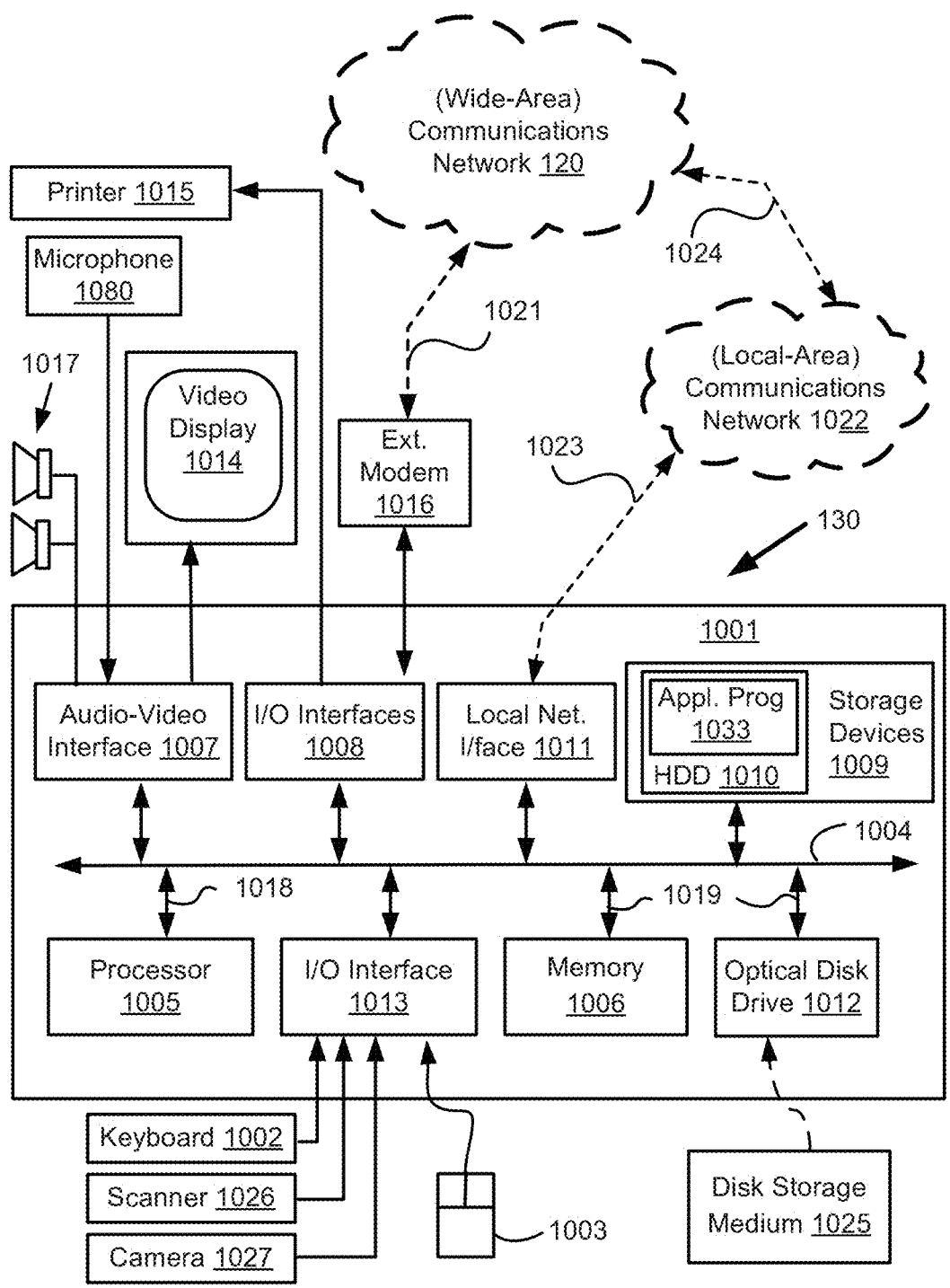
FIGS. 10A and 10B form a schematic block diagram of a general purpose computer system upon which a server described can be practiced.
Figure 10B:
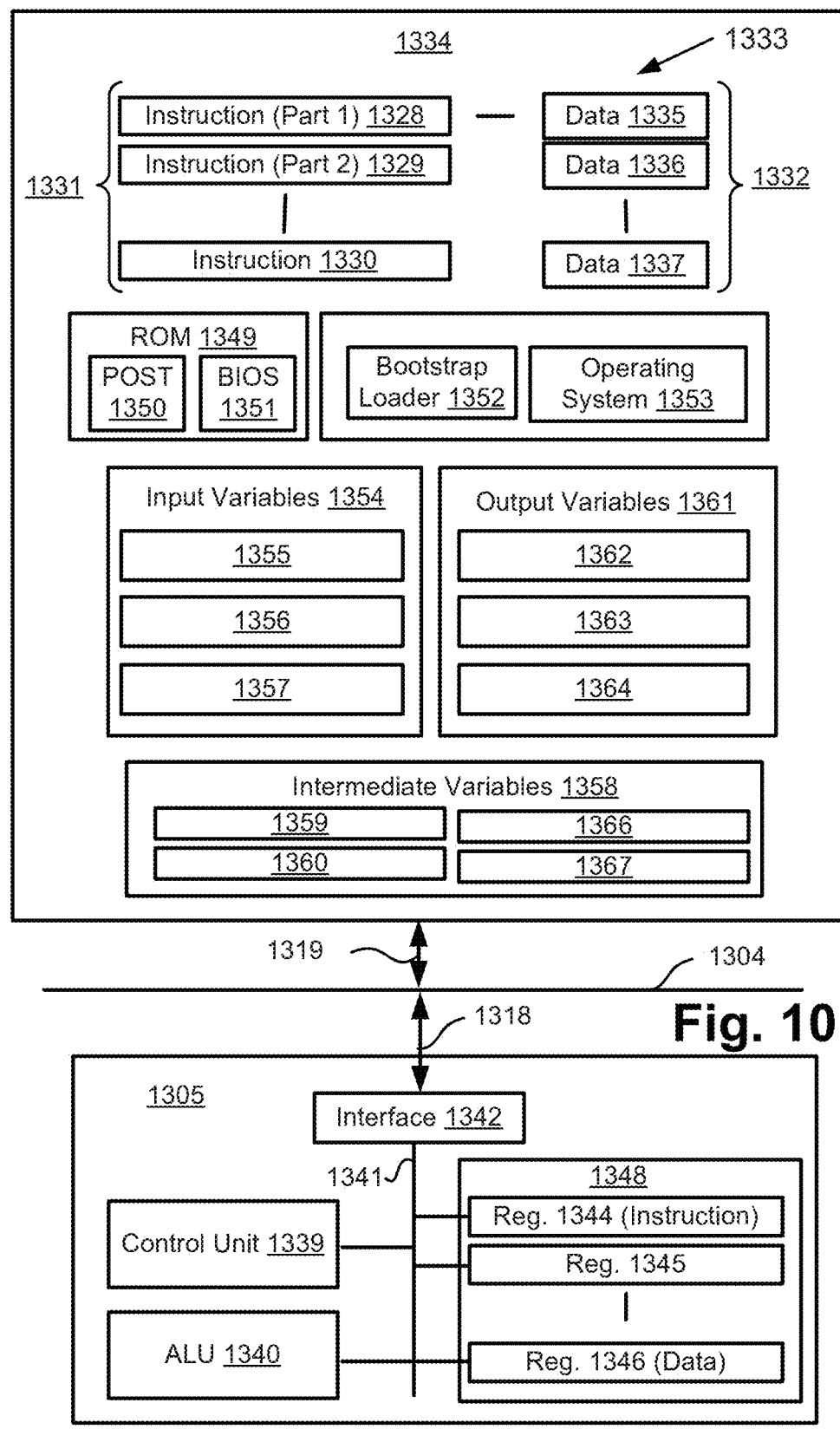

As described above, in one arrangement, the server 130 may be implemented using is a general purpose computer. FIGS. 10A and 10B show the server 130 implemented in the form of a general-purpose computer system.

As seen in FIG. 10A, the server 130 includes: a computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from the communications network 120 via a connection 1021. The communications network 120 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the server 130 via a connection 1023 to a local-area communications network 1022, known as a Local Area Network (LAN). As illustrated in FIG. 10A, the local communications network 1022 may also couple to the wide network 120 via a connection 1024, which would typically include a so-called "firewall" device or device of similar functionality. The local network interface 1011 may comprise an Ethernet circuit card, a Bluetooth™ wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the server 130.

The components 1005 to 1013 of the computer module 1001 typically communicate via an interconnected bus 1004 and in a manner that results in a conventional mode of operation of the server 130 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or a like computer systems.

One or more steps of the methods described below may be implemented using the server 130 wherein the processes to be described, may be implemented as one or more software application programs 1033 executable within the server 130. In particular, one or more steps of the described methods are effected by instructions 1031 (see FIG. 10B) in the software 1033 that are carried out within the server 130. The software instructions 1031 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1033 is typically stored in the HDD 1010 or the memory 1006. The software is loaded into the server 130 from a computer readable medium, and executed by the server 130. Thus, for example, the software 1033 may be stored on an optically readable disk storage medium (e.g., CD-ROM) 1025 that is read by the optical disk drive 1012. A computer readable medium having such software or computer program recorded on the computer readable medium is a computer program product. The use of the computer program product in the server 130 preferably effects an advantageous apparatus for implementing the server 130.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the server 130 from other computer readable media. Computer readable storage media refers to any non-transitory tangible storage medium that provides recorded instructions and/or data to the server 130 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and corresponding code modules may be executed to implement one or more graphical user interfaces (GUIs) to be rendered or otherwise represented upon the display 1014. Through manipulation of typically the keyboard 1002 and the mouse 1003, a user of the server 130 and the application 1033 may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the server 130 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the server 130 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1005 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed arrangements use input variables 1054, which are stored in the memory 1034 in corresponding memory locations 1055, 1056, 1057. The disclosed arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

a fetch operation, which fetches or reads an instruction 1031 from a memory location 1028, 1029, 1030;

a decode operation in which the control unit 1039 determines which instruction has been fetched; and an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

One or more steps or sub-processes in the processes to be described may be associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The augmentation authoring system 140 may have a similar configuration to the server 130 including the computer module 1001 as shown in FIGS. 10A and 10B, and so will not be described in detail.

As seen in FIG. 1A, the server 130 is connected to both the augmentation authoring system 140 and the device 101 via the network 120. The server 130 may be implemented as a "cloud service", where the term cloud service refers to one or more personal computers that store related information and are capable of distributing and sharing the stored information to a one or more client personal computers, via a network (e.g., the Internet) or via a local area network (e.g., 1022).

Figure 2:
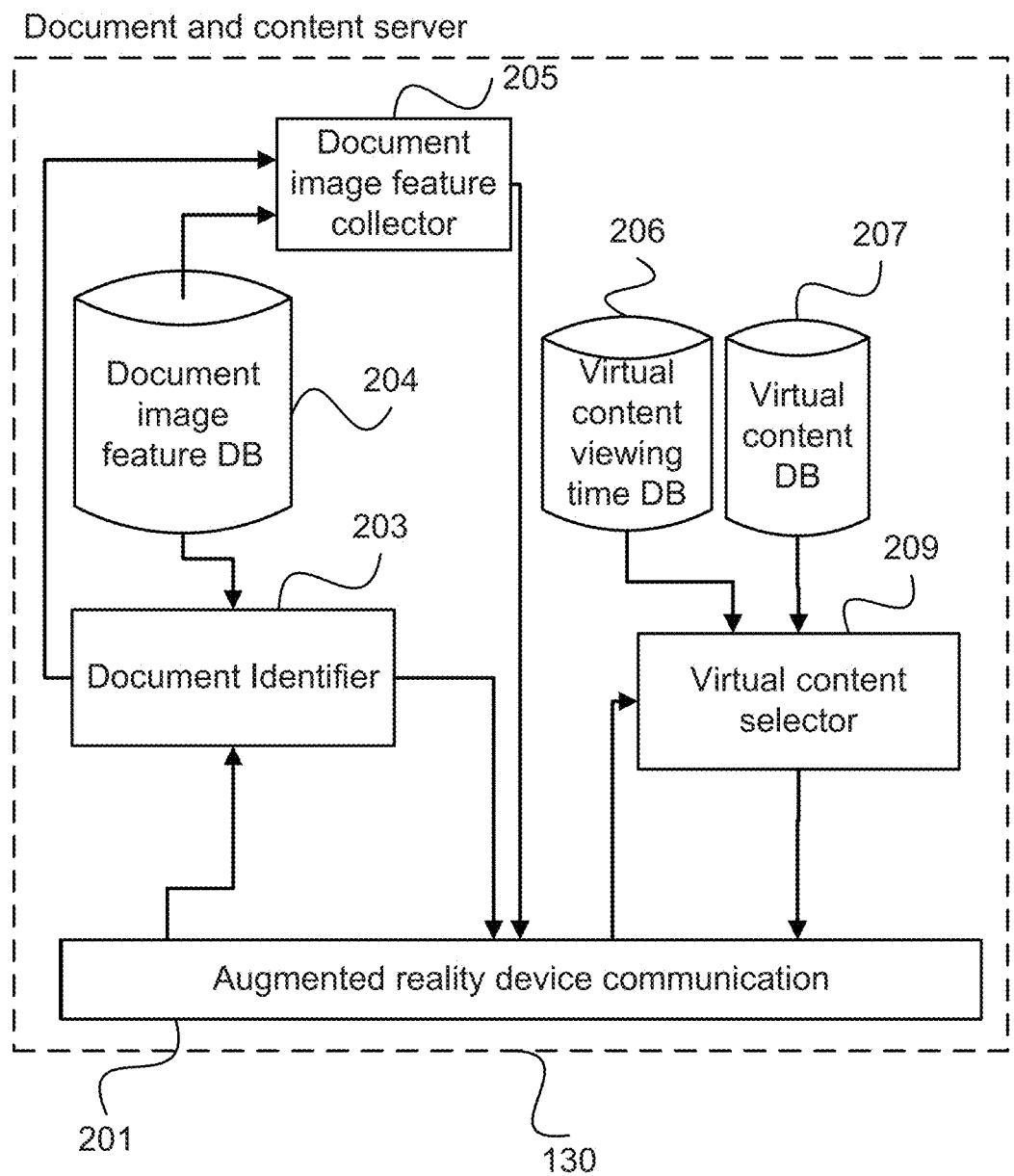
FIG. 2 is a schematic block diagram showing a software architecture of a document and content server.

FIG. 2 is a schematic block diagram showing a software architecture of the document and content server 130. As seen in FIG. 2, the document and content server 130 uses a number of modules 203, 205, and 209 to provide image matching and virtual content 160 selection services to the device 101 (i.e., the augmented reality device). The modules 203, 205 and 209 of the server 130 may be implemented as one or more code modules of the software application 1033 resident within the hard disk drive 1010 of the server 130 and being controlled in its execution by the processor 1005.

The document and content server 130 comprises an augmented reality device communication module 201 configured for receiving and sending data, via the network 120 from and to the electronic device 101 (i.e., the augmented reality device). The data received by the augmented reality device communication module 201 includes at least the image of the captured scene 150 image, location data, and the determined viewing time. The data sent by the augmented reality device communication module 201 comprises matched document identifiers and image features. The data sent by the augmented reality device communication module 201 also includes the selected virtual content 170 as selected by a virtual content selector module 209. The data sent by the augmented reality device communication module 201 also includes the stored document image features from a document image feature collector module 205.

The document and content server 130 also comprises a document identifier module 203 configured for receiving an image (e.g., the image of the document 195) from the augmented reality device communication module 201 and extracting image features from the image. The document identifier module 203 then matches the extracted image features from the image against features stored in a document image feature database 204 configured within the storage device 1009. Image features are extracted using SIFT. After matching, the document identifier module 203 retrieves a document identifier from the document image feature database 204 that is associated with the matched document image features stored in the document image feature database 204. The document identifier and the image features of the document (e.g., the document 195) identified by the document identifier, as returned by a document image feature collector module 205 are sent back to the augmented reality device 101 through the augmented reality device communications module 201.

The virtual content selector 209 receives a document identifier and a viewing time from the augmented reality device communication module 201. The virtual content selector 209 uses the document identifier to retrieve data from a virtual content viewing time database 206 and a virtual content database 207 configured within the storage module 1009. Each viewing time stored in the virtual content viewing time database 206 is associated with virtual content 160 stored in the virtual content database 207. The document identifier is associated with one or more portions of virtual content 160 in the virtual content database 207, and consequently, with one or more virtual content viewing times from the virtual content viewing time database 206. The virtual content selector 209 uses received viewing times to select a virtual content viewing time from the database 206 that requires less time than the determined viewing time. The selected virtual content viewing time is then matched against associated virtual content in the database 207 and returned to the device 101 via the augmented reality device communication module 201.

FIG. 3 is a schematic block diagram showing a software architecture of the electronic device 101 (i.e., the augmented reality device). The device 101 uses a number of modules 310, 320, 340, 360 and 380 to perform image and location data capture of the scene 150, tracking of documents (e.g., the document 195) in the scene 150, and displaying selected virtual content 170. The modules 310, 320, 340, 360 and 380 may be implemented as one or more code modules of the software application 133 resident within the storage module 109 and being controlled in its execution by the processor 105 of the device 101.

As described above, the device 101 comprises the camera 110 which may be used to capture an image of the scene 150.

If the device 101 is unable to track the document 195 in the scene 150 by itself, the device 101 transmits information via document and content server communication module 310 to the document and content server 130 to enable the server 130 to identify the document 195 in the scene 150. Otherwise, if the device 101 is able to track, with a document tracker module 320, the document 195 in the scene 150, then the device 101 retrieves the selected virtual content 170 from a selected virtual content database 330 configured within the storage module 109. The device 101 then displays the selected virtual content 170 on the display 114.

The document and content server communication module 310 receives and sends data via the network 120 to the document and content server 130. The data received by the document and content server communication module 310 is the document identifier and document image features from the document image feature collector 205. The document identifier and document image features form tracking data for the document 195. The data received by the document and content server communication module 310 also includes selected virtual content 170 for display on the display 114. The received data is stored in a tracking database 350, configured within the internal storage 109. The selected virtual content 170 represents a predetermined range of the virtual content 160 and is stored in a selected virtual content database 330 configured within the internal storage 109.

The data sent by the document and content server communication module 310 contains an image of the scene 150 captured by the camera 110 and location information from a location capturing module 360. The data sent by the document and content server communication module 310 also contains an estimate of how long the camera 110 of the device 101 will be able to capture the document from a viewing time module 380. The camera 110 may be one or more of a red green blue (RGB), RGBD, infra-red, three dimensional (3D), or other similar image capturing devices.

The document tracker 320 uses the image of the scene 150 captured by the camera 110 and data from the location capturing module 360, along with tracking data stored in the tracking database 350, to identify the document 195. The document tracker 320 also determines the pose of the document 195 in the captured image of the scene 150. Pose computation can be performed using a method called RANdom SAmple Consensus (RANSAC). The RANSAC method uses the feature points of a query image and compares the query image against the feature points of an image matched to the query image in a prior image matching process. With the two sets of feature points, the document tracker 320 is able to determine a matrix that can be applied to a feature point in the query image to convert the feature point into a feature point in the matched image. The document tracker 320 can provide the pose and identified document data to the display 114 for display.

The selected virtual content database 330 contains a subset of the data contained in the virtual content database 207. In particular, the selected virtual content database 330 only contains the selected virtual content 170 as selected by the virtual content selector 209 for a number of documents. As described above, the selected virtual content 170 represents a predetermined range of the virtual content 170 associated with the document 195. The selected virtual content database 330 reduces storage and processing requirements for the device 101 as the device 101 only needs to store selected virtual content 170 that is displayable to the user within the viewing time and location of the user.

The display 114 allows the selected virtual content 170 to be displayed to the user in unison with an image of the scene 150. In one arrangement, the display 114 is a head mounted display that allows optical see-through of the scene 150 but with the augmented selected virtual content 170 displayed as an overlay. In other arrangements, the display 114 may form part of a tablet, mobile phone or any other electronic device which allows the augmented image of the scene 150 to be displayed to the user.

A tracking database 350 may be configured within the storage module 109 for storing document image features for the documents that are captured by the camera 110 of the device 101. The stored document image features originate from the document image feature database 204.

A location capturing module 360 captures data from location sensors such as a compass and global positioning system (GPS). The module 360 provides a current position of the device 101 as either a relative or an absolute position (e.g., longitude and latitude) as well as heading information. The greater the accuracy of the position and heading information, the more accurate the estimation of the viewing time will be. The data is ultimately used by the viewing time module 380 when estimating the amount of viewing time that the user has available. Alternatively, a location capturing module 360 may use a network of Pan/Tilt/Zoom cameras and people-tracking algorithms to pin point location of a person.

The camera 110 captures images of the scene 150. Typically, the camera 110 is a video camera that can record successive frames of images at a video frame rate which is typically thirty (30) frames per second.

The viewing time module 380 estimates the amount of time that a user will have at their disposal to view an identified document such as the document 195. The viewing time module 380 uses data from the location capturing module 360 relayed by the document tracker module 320 and the pose data calculated by the document tracker module 320 to determine a viewing time. The viewing time is determined by at least determining a change in pose to determine a relative motion between the device 101 and the document 195, where the relative motion may be a relative velocity. As described above, the viewing time represents an estimate of the amount of time that a user will have at their disposal to view the document 195, as will be described in more detail below. In an alternative arrangement, the viewing time module 380 may reside on the document and content server 130 instead of the device 101.

Figure 4:
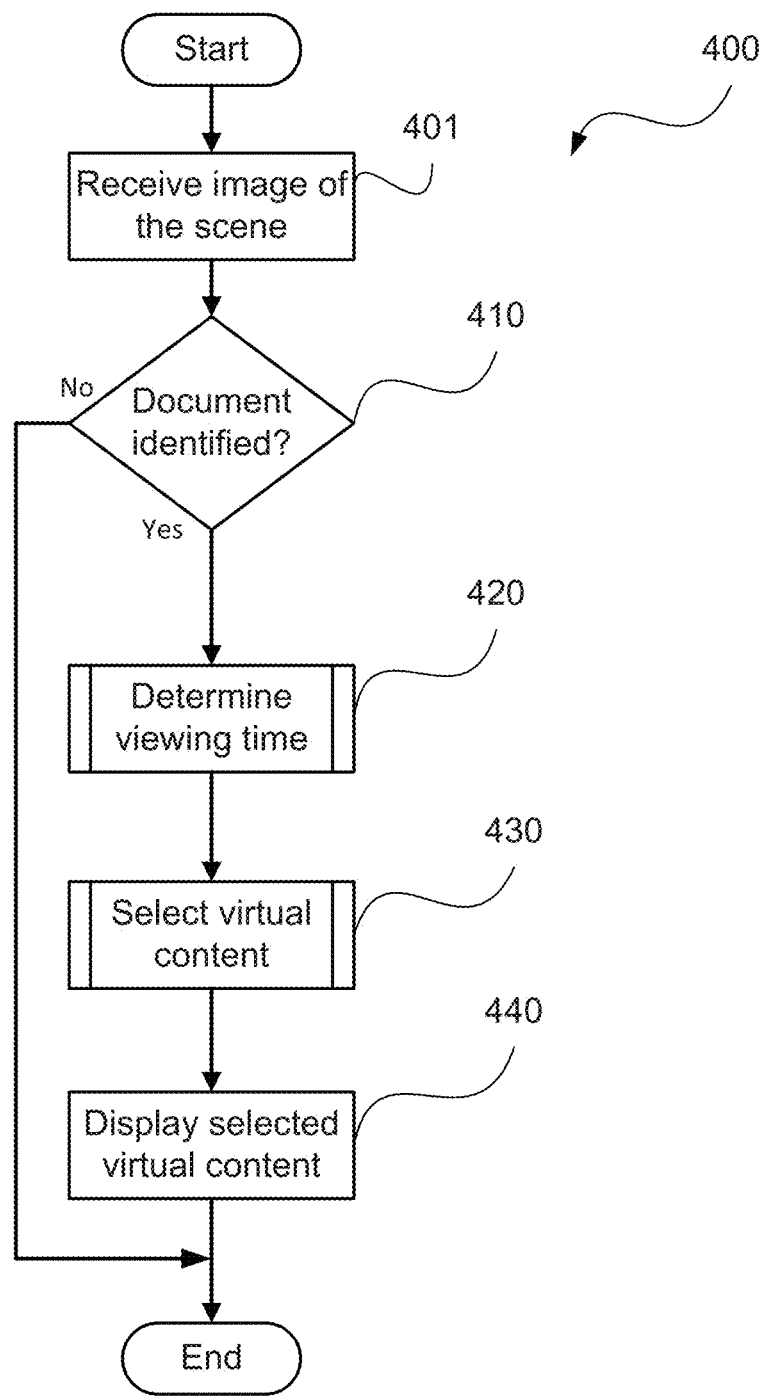
FIG. 4 is a schematic flow diagram showing a method of displaying virtual content.
Figure 5:
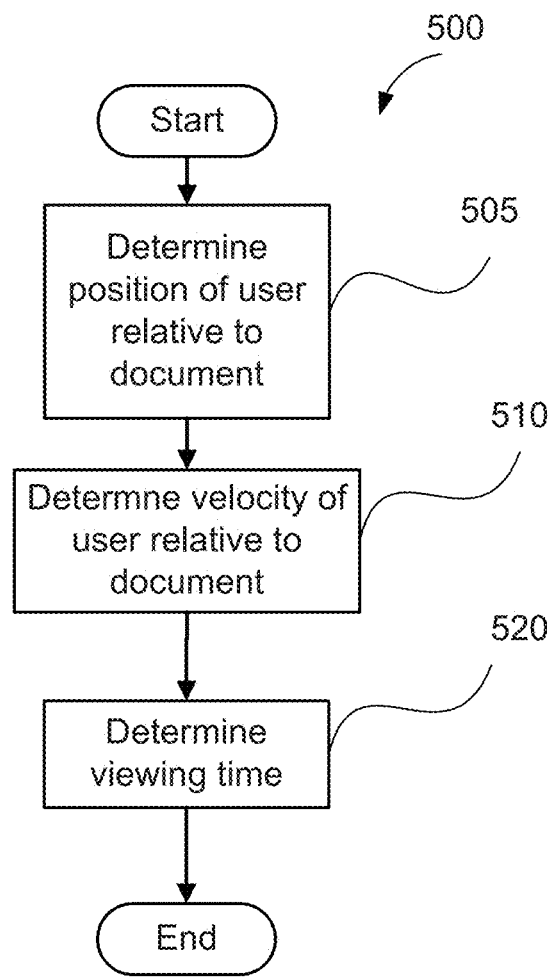
FIG. 5 is a schematic flow diagram showing a method of determining viewing time.

FIG. 4 is a schematic flow diagram showing a method 400 of displaying virtual content on an augmented reality device 101. The method 400 may be performed by one or more of the modules 310, 320, 340, 360 and 380 which, as described above, may be implemented as one or more code modules of the software application program 133 resident in the storage module 109 and being controlled in its execution by the processor 105 of the device 101. The method 400 will be described by way of example where the method 400 is used for initially retrieving and displaying the selected virtual content 170 being associated with the scene 150 comprising the document 195.

The method 400 begins at receiving step 401, where the processor 105 is used for receiving an image of the scene 150 captured using the camera 110 of the device 101 (i.e., the augmented reality device). Location information from the location capturing module 360 is also received by the document tracker 320.

At decision step 410, the document tracker 320, under execution of the processor 105, determines whether a document (e.g., 195) in the captured image of the scene 150 can be identified and tracked using information contained in the tracking database 350.

Since FIG. 4 shows the initial retrieving and displaying of the selected virtual content 170 for a newly seen document in the form of the document 195, the tracking database 330 will not contain information for tracking. The document tracker 320 transmits the captured image of the scene 150 and location data from the location capturing module 360 to the document and content server 130 using the document and content server communication module 310 and the network 120. After some processing, the document and content server 130 responds with an identifier for the identified document 195 retrieved by the document identifier module 203. The document and content server 130 also responds with the image features for the document 195 collected by the document image feature collector module 205. If however, the document and content server 130 was unable to identify any documents in the captured image of the scene 150 then the method 400 ends.

At determining step 420, the viewing time module 380, under execution of the processor 105, is used for determining the viewing time of the scene 150. The determined viewing time represents an estimate of the time available for the user to view the document 195 which may represent advertisements. The viewing time is determined at step 420 according to a relative motion between the device 101 (i.e., the augmented reality device) and the scene 150. The viewing time is determined using the location data from the location capturing module 360 and pose data determined by the document tracker module 320. A method 500 of determining a viewing time, as executed at step 420, will be described in detail below with reference to FIG. 5.

At selecting step 430, the processor 105 of the device 101 is used for selecting virtual content from a predetermined range of the virtual content stored in the selected virtual content database 330 for the identified document 195. The virtual content is selected based on the viewing time determined at step 420. If there is no record of selected virtual content in the database 330 then the document tracker 320 transmits the determined viewing time and document identifier to the document and content server 130. The document and content server 130 responds with the virtual content 160 selected to be used as the selected virtual content 170. The selected virtual content 170 is then stored in the selected virtual content database 330.

In one arrangement, the selection criteria used at step 430 for selecting the selected virtual content 170 is based upon a single prescribed time measure. The prescribed time measure corresponds to a length of time that an author of the virtual content 160 determined that a user of the device 101 would require to view the selected virtual content 170. If a prescribed time measure for a portion of the virtual content 160 is less than the viewing time determined at step 420 then the portion of the virtual content 160 is selected at step 430 to be the selected virtual content 170.

A method 600 of selecting virtual content, which may alternatively be executed at step 430, will be described in detail below with reference to FIG. 6.

The method 400 concludes at displaying step 440, where the processor 105 is used for displaying the selected virtual content 170 previously stored in the selected virtual content database 330 on the augmentation display 114. The selected virtual content 170 is displayed on the display 114 together with the image of the scene received at step 401.

As described above, the method 400 is implemented by the device 101 with the document and content server 130 providing the identifier and image features for the identified document 195, and for providing the selected virtual content 170.

In alternative arrangements, the method 400 of FIG. 4 can be implemented entirely by the device 101, rather than being split across the device and server 130, where the device 101 provides the identifier and image features for the identified document 195, and provides the selected virtual content 170. In such an alternative arrangement, the document image feature database 204, virtual content viewing time database 206 and virtual content database 207 are configured within the device 101.

The method 500 of determining a viewing time, as executed at step 420, will now be described with reference to FIG. 5. The method 500 may be performed by one or more of the modules 310, 320, 340, 360 and 380 which, as described above, may be implemented by one or more code modules of the software application 133 resident within the storage module 109 and being controlled in its execution by the processor 105 of the device 101.

The method 500 begins at a position determining step 505, where the viewing time module 380, under execution of the processor 105, determines a real-world distance separating the device 101, and therefore a user of the device 101, from the document 195 in the scene 150. The real-world distance is determined using a combination of properties of the camera 110 of the device 101 and similar triangles. The properties of the camera 110 used at step 505 include camera sensor height, focal length and image frame height. The real-world distance can be determined at step 505 using Equation (1), as follows:

$$\text{distance} = \frac{\text{device camera focal length} \times \text{real world document height} \times \text{image frame height}}{\text{document image height} \times \text{device camera sensor height}} \quad (1)$$

Following step 505 the viewing time determination method 500 proceeds to a velocity determination step 510.

At step 510, the viewing time module 380, under execution of the processor 105, determines the velocity of the device 101, and therefore the velocity of the user of the device 101, relative to the document 195 in the scene 150. The velocity is determined based on a change in the distance determined at step 505. The change in the distance may be determined using pose information determined by the document tracker module 320 for each successive video image of the scene 150 captured by the camera 110. Pose information is used to determine change in translation of the tracked document 195 between successive video images of the scene 150. The change in translation is used in combination with an operating frame-rate of the document tracker module 320 to determine relative velocity of the device 101, and therefore the relative velocity of user of the device 101, to the document 195 in the scene 150.

Once the relative velocity of the device 101, and therefore the user, to the document in the scene 150, has been determined, the viewing time determination method 500 proceeds to the viewing time determining step 520. At step 520, the viewing time module 380, under execution of the processor 105 of the device 101 determines a viewing time representing an estimate of how long the user has to view the document 195 in the scene 150. To determine the viewing time for the user, the viewing time module 380, under execution of the processor 105 of the device 101, is used for firstly retrieving a viewing radius, associated with the identified document 195 in the scene 150, from the selected virtual content database 330. The viewing time module 380 of the device 101 then determines if the real-world distance determined at step 505 is within the viewing radius of the identified document 195 in the scene 150. If the real-world distance determined at step 505 is within the viewing radius of the identified document 195 in the scene 150, then the user is determined to be within the viewing radius.

If the user is within the viewing radius of the identified document 195 in the scene 150, then the viewing time module 380 of the device 101 determines two points on a secant line that intersects a viewing circle around the identified document 195 in the scene 150. The viewing circle is a circle whose radius is that of the viewing radius of the document 195 in the scene 150. The intersection points may be determined by firstly describing a line using a direction of the user as determined in the velocity determination step 510 and then solving a pair of quadratic equations to determine the intersection points of the line that lie on a circle described by the viewing radius of the identified document 195 in the scene 150. A first point of intersection defines the current location of the user, a second point of intersection will determine where the user will leave the viewing circle of the identified document 195 in the scene 150. The device 101 determines the distance between the two intersection points and uses the velocity determined in the velocity determination step 510 to determine the amount of time that the user has to view the identified document in the scene 150. Once the viewing time of the user has been determined at the viewing time step 520, the viewing time estimation method 500 ends.

The method 600 of selecting virtual content, which may be executed at step 430, will now be described in detail below with reference to FIG. 6. The method 600 executes in the document and content server 130. The method 600 may be performed by one or more of the modules 203, 205 and 209 which, as described above, may be implemented as one or more code modules of the software application 1033 resident within the hard disk drive 1010 of the server 130 and being controlled in its execution by the processor 1005.

In an alternate arrangement executing the method 600, the content of the virtual content viewing database 206 is expanded to contain several complexity measures. In such an arrangement, the virtual content 106 may be selected at step 430 based on a complexity measure of the virtual content 106. The complexity measure may provide an indication of an amount of detail in the virtual content 106. The complexity measures contained in the virtual content viewing database 206 may be a measure of time to perform an action, such as downloading or rendering. Alternatively, the complexity measures may be a device capability such as requiring a colour display or an amount of free device memory. The complexity measures may also be a network limitation such as a certain download speed, a download lag or data allocation. In still another alternative arrangement, the complexity measures may be an environmental limitation requiring the virtual content to be viewed between certain hours, or on a rainy day.

The method 600 begins at extracting step 605, where virtual content 160 associated with the document identifier of the identified document 195 in the captured image of the scene 150 is extracted from the virtual content database 207 configured within the hard disk drive 1010.

At extracting step 610, the processor 1005 is used for extracting complexity measures associated with the identified document identifier from the virtual content viewing time database 206. The complexity measures are set and stored in the virtual content viewing time database 206 by the author of the virtual content 160 using the augmentation authoring system 140. For example, a complexity measure of storage space for a portion of the virtual content 160 may require two (2) MB of storage space in the storage module 109 of the device 101. The storage space complexity measure may be set automatically during the authoring of the virtual content 160 in the augmentation authoring system 140. Other more complex complexity measures, for example, amount of time required for the user of the device 101 to view and understand the selected virtual content 170 may be manually entered into the system 100 by the author of the selected virtual content 170 using the augmentation authoring system 140.

Then at step 620, the processor 1005 is used for determining a viewing time in accordance with the method 500. The method 500 may be executed at step 620 by the processor 1005 of the document and content server 130.

At decision step 630, the virtual content selector 209, under execution of the processor 1005, searches for a portion of virtual content 160 from the virtual content database 207 whose complexity measures extracted at step 610 can be represented as a time duration that is within the estimated viewing time determined at step 620.

If a suitable portion of virtual content 160 is found at step 630 then the method 600 proceeds to selecting step 650. Otherwise, the method 600 concludes.

At step 650, the portion of virtual content is selected as the selected virtual content 170 to be displayed on the display 114 of the device 101.

As described above, if no suitable portion of virtual content 160 is found at step 630, then the method 600 concludes and no content is displayed on the display 114.

Figure 8:
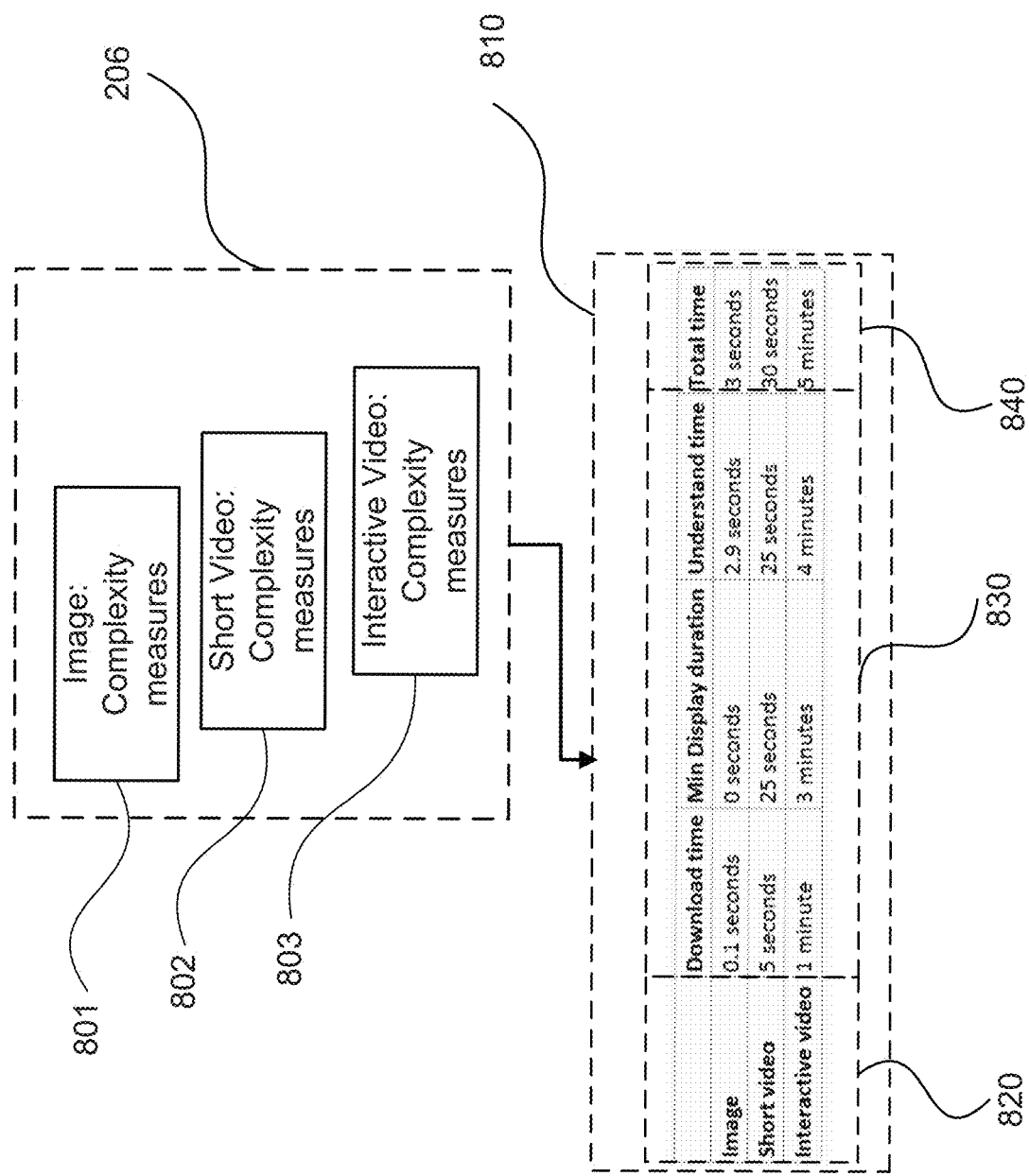
FIG. 8 an example of data contained in a virtual content viewing time database.

FIG. 8 shows the data contained in the virtual content viewing time database 206 in an alternative arrangement. In the arrangement of FIG. 8, the virtual content viewing time database 206 contains, instead of viewing time, a complexity measure per entry. In FIG. 8, the virtual content viewing time database 206 contains three entries including complexity measure 801 of a static image of the document 195, complexity measure 802 of a short video of the document 195, and complexity measure 803 of an interactive video of the document 195.

Figure 6:
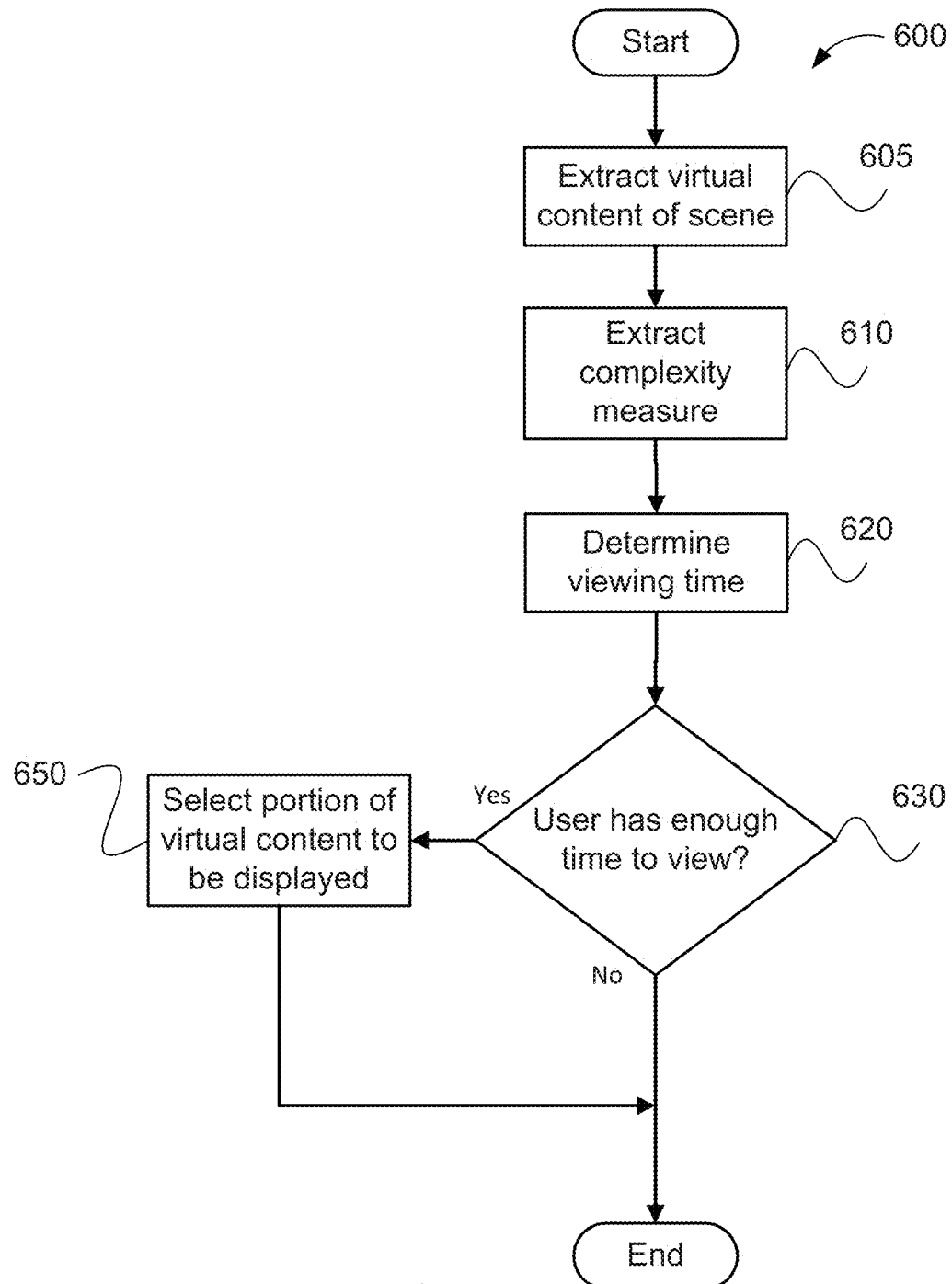
FIG. 6 is a schematic flow diagram showing a method of selecting virtual content.

Table 810 represents a portion of a view of the contents of the virtual content viewing time database 206 in an arrangement executing the method 600 of FIG. 6.

Each row of the table 810 corresponds to a part of a virtual content viewing time record stored in the virtual content viewing time database 206. The table 810 is separated into three groups of columns including a first group 820 containing a label (i.e., Image, Short video, Interactive video) to map between content in the virtual content viewing time database 206 for the document 195.

The complexity measures of the second group 830, in the example of FIG. 8, includes three complexity measures that are indicative of amount of detail in the virtual content 106 of the document 195 associated with the table 810. The complexity measures are expressed as time in the example of FIG. 8.

The three complexity measures of the group 830 include a first group, "download time", which represents time required to download each portion of virtual content 160 (i.e., the image, short video and interactive video) if the portion of virtual content 160 were to be the selected virtual content 170 given a complexity aspect of the portion of virtual content 160 selected as the selected virtual content 170.

The three complexity measures of the group 830 include a second group, "min display duration", which represents amount of time required for a user to view each portion of virtual content 160 (i.e., image, short video, interactive video) if the portion of virtual content 160 were to be the selected virtual content 170 given a complexity aspect of content quantity of the portion of virtual content 160.

The three complexity measures of the group 830 include a third, "understand time", which represents amount of time required for a user to understand an underlying message of each portion of virtual content 160 (i.e., image, short video, interactive video) if the portion of virtual content 160 were to be the selected virtual content 170 given a complexity aspect of human comprehension of the portion of the virtual content 160. The complexity aspect of human comprehension of the corresponding portion of virtual content 160 is set by the author of the document 195 using the augmentation authoring system 140.

There are other complexity measures that may be taken into consideration in an alternative arrangement, such as but not limited to: render time, storage requirements, device requirements, and not all complexity measures used in accordance with the methods described above are expressed as units of time. For example, another complexity measure is amount of memory 170 of the device 101 required to hold selected virtual content 170. Another example of a complexity measure is virtual content 160 that requires the augmented reality device 101 to have a minimum number of pixels.

The final group 840 of the table 810 contains an illustrative total time required when considering the complexity measures expressed in the table 810 as time.

In an alternative arrangement, depth information may be used to determine distance between an object, such as the document 195, in the scene 150 and the user of the device 101. A depth sensor may be used to determine distance between the document 195 in the scene 150 and the user of the device 101. The depth sensor can be a device that emits an Infra-red beam spread and that computes distances based on time elapsed before the beam reflects back to the depth sensor device. Alternatively, the depth sensor may be an RGBD camera. Alternatively, the depth sensor may use stereo cameras to determine the distance.

Figure 7:
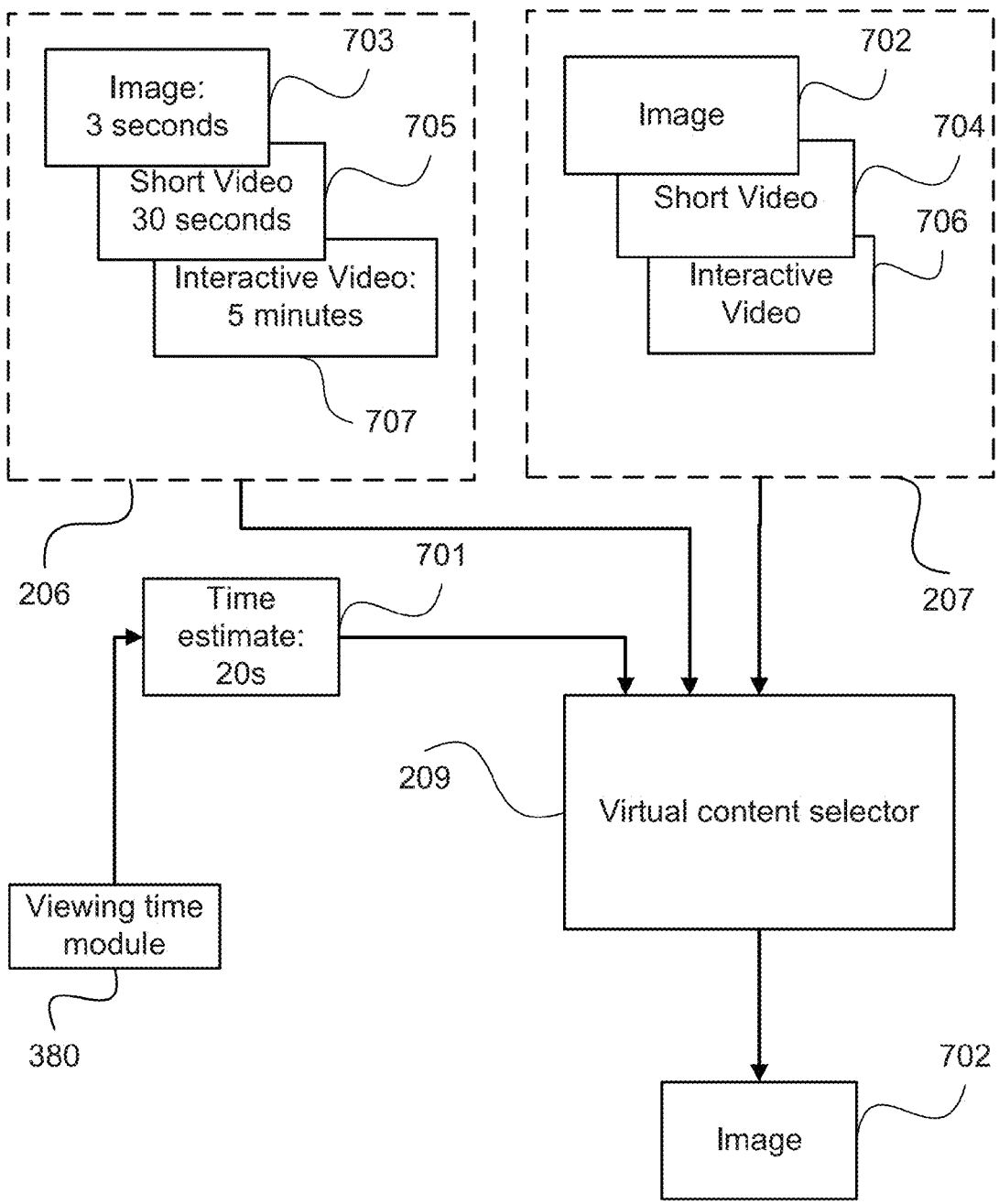
FIG. 7 shows a usage example of a virtual content viewing time database, virtual content database, viewing time estimator and virtual content selector.

FIG. 7 shows a usage example of the virtual content viewing time database 206, the virtual content database 207, viewing time module 380 and virtual content selector 209.

In the example of FIG. 7, the virtual content database 207 contains three entries including a static image 702, a short video 704 and an interactive video 706 each to be displayed as virtual content. Associated with each entry in the database 207 is an entry in the virtual content viewing time database 206. FIG. 7 also shows a viewing time 703 for the image 702, a viewing time 705 for the short video 704 and a viewing time 707 for the interactive video 706.

In the example of FIG. 7, the viewing time module 380 has determined a viewing time 701 of twenty (20) seconds representing time that the user of the device 101 has (i.e., twenty (20) seconds) to view selected virtual content 170. The virtual content selector 209 compares the viewing time 701 as determined by the viewing time module 380 against the viewing times stored in the virtual content viewing time database 206 and select a corresponding portion of virtual content 160 having an associated viewing time that is less than or equal to the determined viewing time 701. In the example of FIG. 7, the virtual content selector 209 determines that the image 702 satisfies the determined viewing time 701 of twenty (20) seconds as the image 702 only takes three (3) seconds to view as shown at 703 of FIG. 7.

Figure 9A:
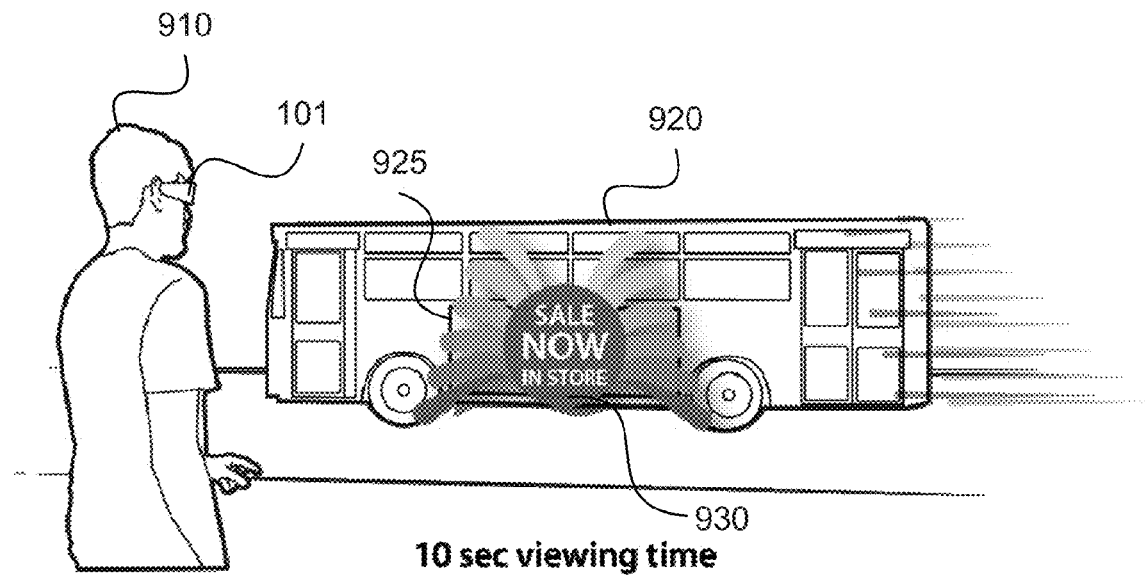
FIG. 9A shows a user viewing a document with the device of FIGS. 1A, 1B and 1C in one example.

FIG. 9A shows an example where a user 910 wearing the device 101 (i.e., the augmented reality device) views a scene containing a bus 920 that is moving rapidly across the view of the users 910. On the bus 920 there is a printed advertisement 925 as typically found on busses. By using the device 101, the user 910 sees selected virtual content (i.e., 170) displayed as a static image 930 on the side of the bus 920.

Figure 9B:
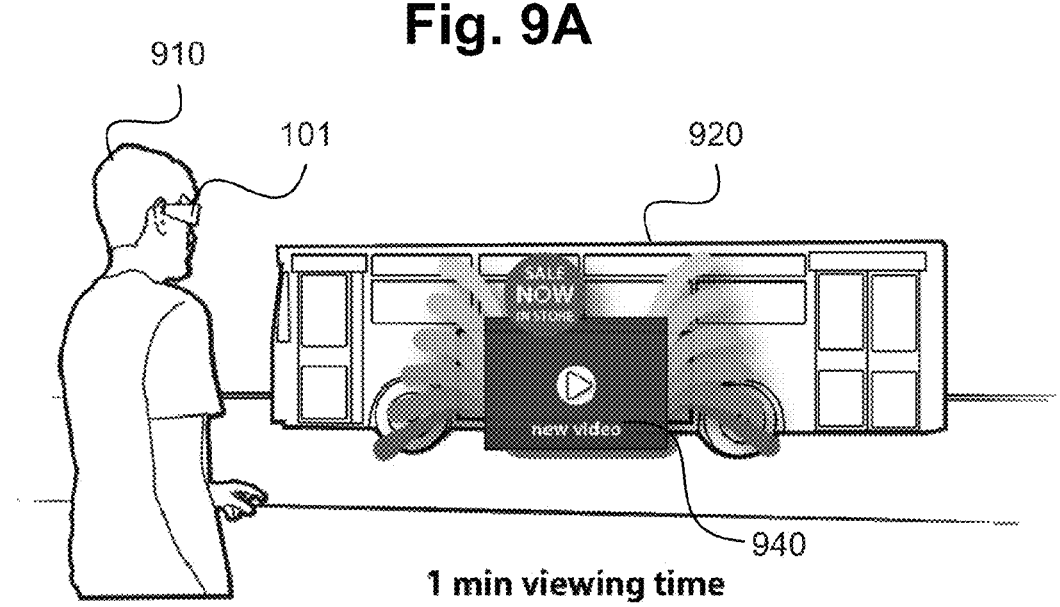
FIG. 9B shows another example of the user viewing a document with the device of FIGS. 1A, 1B and 1C.

Similarly, FIG. 9B shows the user 910 also wearing the device 101 to view a scene containing the bus 920 that is moving slowly across the view of the user 910. In the example of FIG. 9B, however, since the bus 920 is moving slowly the document and content server 130 selects a video 940 for selected virtual content (i.e., 170) to be viewed on the side of the bus 920.

The bus 920 of FIG. 9B may also have a unique identifier located on the bus and visible to the user 910. The unique identifier allows the device 101 to identify the bus 920. The identifier may also be used to retrieve timetable information for the bus 920 from a server. The timetable information may be used as part of the process of determining how long the bus 920 will be visible to the device 101.

Alternatively, timetable information may be used to determine how long an advertisement may be visible on a train. An identifier in the advertisement allows the train to be identified and timetable information for the train to be retrieved. The time table information allows the device 101 to determine how long the train may be visible to the device 101. For example, if the timetable shows that the train will be at a train station for the next two minutes before departing, suitable content may be selected from the content server to be displayed on the train for the next two minutes.

The train timetable may also be used to determine how long an advertisement will be visible before the advertisement will be obscured by a train. Such a situation occurs when the advertisement is located over the train track so that passengers waiting for the train are exposed to the advertisement. In such an example, the device 101 may use timetable information to determine how long until the advertisement will be blocked by a train arriving at the station. Suitable virtual content may then be selected for display according to the arrival time of the next train.

Another alternative arrangement may use historical information to determine how long an advertisement may be in view for a user catching public transport. The historical information may be collected from previous viewers of the advertisement and linked back to the public transport information such as the route information and timetable information. An estimate of the viewing time may then be calculated by first determining the public transport route information and retrieving historical information from users that viewed the advertisement. The historical information may be an average of historical viewing times. The historical information may then be used as part of the viewing time estimation.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of displaying virtual content on an augmented reality device, the virtual content being associated with a scene, the method comprising:
receiving an image of a scene captured using the augmented reality device;
determining a viewing time of the scene, according to a relative motion between the augmented reality device and the scene, the viewing time defining an estimated period of time that the scene will be visible to the augmented reality device;
selecting virtual content, from a predetermined range of virtual content, based on the determined viewing time; and displaying the virtual content on the augmented reality device together with the image of the scene.

2. A method according to claim 1, wherein the viewing time is determined by at least determining a change in pose.

3. A method according to claim 1, wherein depth information is used to determine distance between an object in the scene and the augmented reality device.

4. A method according to claim 1, wherein depth information is used to determine distance between an object in the scene and the augmented reality device, the viewing time being determined by determining a relative velocity based on a change in said distance.

5. A method according to claim 1, wherein the virtual content is selected based on a complexity measure of the virtual content.

6. A method according to claim 1, wherein the virtual content is selected based on a complexity measure of the virtual content, and wherein the complexity measure provides an indication of an amount of detail in the virtual content.

7. A method according to claim 1, wherein the virtual content is selected based on a complexity measure of the virtual content, and wherein the complexity measure is a network limitation.

8. A method according to claim 1, wherein the virtual content is selected based on a complexity measure of the virtual content, and wherein the complexity measure is a device capability.

9. A method according to claim 1, wherein the virtual content is selected based on a complexity measure of the virtual content, and wherein the complexity measure is an environmental limitation.

10. A method according to claim 1, wherein the virtual content is selected based on a complexity measure of the virtual content, and wherein the complexity measure is an indication is a measure of time to perform an action.

11. A method according to claim 1, wherein the relative motion is a relative velocity.

12. A method according to claim 1, further comprising retrieving a viewing radius associated with the scene.

13. A method according to claim 1, further comprising determining if a real-world distance is within a viewing radius associated with the scene.

14. A method according to claim 1, wherein the scene captured using the augmented reality device includes an identifier and the viewing time of the scene is further determined based on timetable information related to the identifier.

15. A method according to claim 1, wherein the viewing time is further determined based on historical viewing times of the virtual content.

16. A method according to claim 1, wherein the virtual content is selected based on a comparison of the determined viewing time and a length of time required to view the virtual time.

17. A system for displaying virtual content on an augmented reality device, the virtual content being associated with a scene, the system comprising:

a memory for storing data and a computer program;

a processor coupled to the memory for executing the computer program, the computer program comprising instructions for:

receiving an image of a scene captured using the augmented reality device;

determining a viewing time of the scene, according to a relative motion between the augmented reality device and the scene, the viewing time defining an estimated period of time that the scene will be visible to the augmented reality device;

selecting virtual content, from a predetermined range of virtual content, based on the determined viewing time; and displaying the virtual content on the augmented reality device together with the image of the scene.

18. An apparatus for displaying virtual content on an augmented reality device, the virtual content being associated with a scene, the apparatus comprising:

means for receiving an image of a scene captured using the augmented reality device;

means for determining a viewing time of the scene, according to a relative motion between the augmented reality device and the scene, the viewing time defining an estimated period of time that the scene will be visible to the augmented reality device;

means for selecting virtual content, from a predetermined range of virtual content, based on the determined viewing time; and means for displaying the virtual content on the augmented reality device together with the image of the scene.

19. A non-transitory computer readable medium having a computer program stored thereon for displaying virtual content on an augmented reality device, the virtual content being associated with a scene, the program comprising:

code for receiving an image of a scene captured using the augmented reality device;

code for determining a viewing time of the scene, according to a relative motion between the augmented reality device and the scene, the viewing time defining an estimated period of time that the scene will be visible to the augmented reality device;

code for selecting virtual content, from a predetermined range of virtual content, based on the determined viewing time; and code for displaying the virtual content on the augmented reality device together with the image of the scene.

* * * * *